United States Patent
Yu et al.

(10) Patent No.: US 9,264,417 B2
(45) Date of Patent: Feb. 16, 2016

(54) METHOD AND APPARATUS FOR GENERATING A SECURITY TOKEN CARRIER

(71) Applicant: Tencent Technology (Shenzhen) Company Limited, Shenzhen (CN)

(72) Inventors: Xin Yu, Shenzhen (CN); Lina Yuan, Shenzhen (CN); Ji Zhao, Shenzhen (CN); Jiwei Guo, Shenzhen (CN); Anqi Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/087,979

(22) Filed: Nov. 22, 2013

(65) Prior Publication Data

US 2014/0082718 A1 Mar. 20, 2014

Related U.S. Application Data

(63) Continuation of application No. PCT/CN2012/072700, filed on Mar. 21, 2012.

(30) Foreign Application Priority Data

May 23, 2011 (CN) .......................... 2011 1 0133940

(51) Int. Cl.
*G06F 21/00* (2013.01)
*H04L 29/06* (2006.01)

(52) U.S. Cl.
CPC ................ *H04L 63/08* (2013.01); *G06F 21/00* (2013.01)

(58) Field of Classification Search
CPC ... H04L 63/08; H04L 63/083; H04L 63/0838; H04L 63/0846; H04L 63/0853; G06F 21/00; G06F 21/31; G06F 21/34; G06F 21/36
USPC .......................................................... 726/9
See application file for complete search history.

(56) References Cited

U.S. PATENT DOCUMENTS

2003/0177366 A1* 9/2003 de Jong .......................... 713/184
2008/0276098 A1* 11/2008 Florencio et al. ............. 713/183

FOREIGN PATENT DOCUMENTS

CN         1694396           11/2005
CN      101859504 A    * 10/2010

OTHER PUBLICATIONS

Machine Translation of CN 101859504 A.*

(Continued)

*Primary Examiner* — Yogesh Paliwal
(74) *Attorney, Agent, or Firm* — Harness, Dickey & Pierce, P.L.C.

(57) ABSTRACT

A method and an apparatus for generating a security token carrier, which belong to the field of data security, are disclosed. The method may include: generating multiple pieces of token information, establishing a relation which associates the token information with location information of a pre-set interactive security token carrier; obtaining security data which is set by a user for protecting the interactive security token carrier; and generating the interactive security token carrier by using the token information, the relation, the security data and public information of the interactive security token carrier. The apparatus may include: a token information processing module, a security data obtaining module and an interactive security token carrier generating module.

17 Claims, 6 Drawing Sheets

(56) References Cited

OTHER PUBLICATIONS

International Preliminary Report on Patentability for International Application No. PCT/CN2012/072700, mailed Dec. 5, 2013.
International Search Report for International Application No. PCT/CN2012/072700, mailed Jul. 5, 2012.
Written Opinion for International Application No. PCT/CN2012/072700, mailed Jul. 5, 2012.

* cited by examiner

METHOD AND APPARATUS FOR GENERATING A SECURITY TOKEN CARRIER

RELATED DOCUMENTS

This application is a U.S. continuation application under 35 U.S.C. §111(a) claiming priority under 35 U.S.C. §120 and 365(c) to International Application No. PCT/CN2012/072700 filed on Mar. 21, 2012,which claims the priority benefit of Chinese Patent Application No. 201110133940.4 filed on May 23, 2011,the contents of which are incorporated by reference herein in their entirety for all intended purposes.

BACKGROUND

The present application relates to data security, and particularly, to a method and an apparatus for generating a security token carrier. At present, there are more and more Internet applications, such as online games, e-commerce and so on. Malicious behaviors including stealing user accounts and virtual properties are also becoming rampant and put users' various virtual properties at risk. In order to protect virtual properties of authorized users, user identities are checked by verifying login passwords of users when the users attempt to log into a system. But verification of login password is not enough to authenticate a user because the login password verification may be easily cracked through brutal guessing attempts, or through intercepting keyboard signals or through obtaining screenshots of the user and so on. One common method that is relatively secure in terms of protection of authorized users involves setting for a user multiple dedicated tokens and verifying one or more tokens besides the password verification to prove the user is authorized. Currently carrier of a token (also referred to as security token carrier) is often called a security token card.

SUMMARY

In order to solve a problem in the conventional art, embodiments of the present invention provide a method and an apparatus for generating a security token carrier. The technical schemes are as follows.

A method for generating a security token carrier may include:

generating multiple pieces of token information, establishing a relation which associates the token information with pre-set location information of an interactive security token carrier;

obtaining security data which is set by a user for protecting the interactive security token carrier;

generating the interactive security token carrier by using the token information, the relation, the security data and public information of the interactive security token carrier.

An apparatus for generating a security token carrier may include:

a token information processing module, for generating multiple pieces of token information, establishing a relation which associates the token information with pre-set location information of an interactive security token carrier;

a security data obtaining module, for obtaining security data which is set by a user for protecting the interactive security token carrier; and an interactive security token carrier generating module, for generating the interactive security token carrier by using the token information, the relation, the security data and public information of the interactive security token carrier.

The technical scheme provided by embodiments of the present invention has the following merits.

Security data is adopted for protecting the interactive security token carrier so that illegal users cannot obtain the interactive security token carrier easily. Furthermore, the token information in the interactive security token carrier is displayed only during interaction with the user, and only part of the token information may be displayed during the interaction, thus the security of the security token carrier is improved.

DETAILED DESCRIPTIONS

Embodiments are hereinafter described in detail with reference to the accompanying drawings to make the objective, technical scheme and merits of the present invention more apparent.

Conventional security token cards mainly include physical token cards, image token cards and mobile phone token cards and so on. Generation of various security token cards may include: a security server generates multiple random figures by using a certain randomized algorithm; printing companies print the multiple random figures onto a card in the form of a two-dimensional matrix to produce a physical security token card, or the security server converts the multiple random figures into an image including texts arranged into a two-dimensional matrix to produce an image token card or a mobile phone security token card. From the above it can be seen that despite the various forms of the cards, conventional security token cards all involve a two-dimensional matrix which includes a series of figures serving as token information.

The above generating process of security token cards does not include protection of the security token cards, thus the cards may be easily obtained maliciously. Further, token information in a conventional security token card is exhibited on a face in the form of a two-dimensional matrix, thus all of the token information in a security token card can be obtained once the security token card is obtained. For those reasons, conventional security token cards provide limited security.

The security token carrier refers to a carrier bearing token information according to embodiments of the present invention.

Embodiment One

Figure 1:
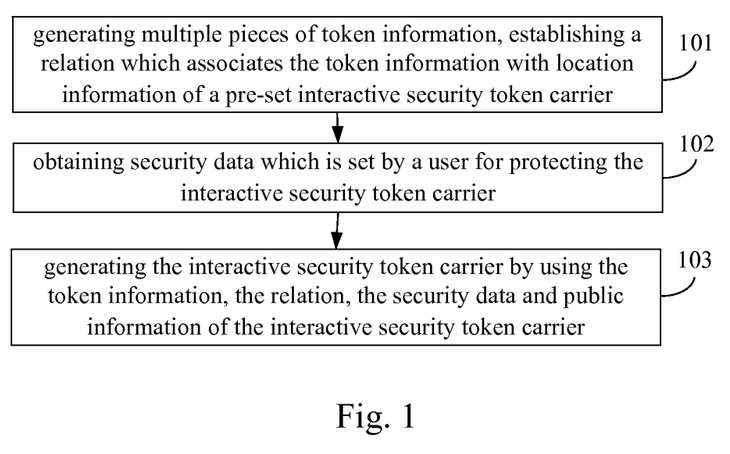
FIG. 1 is a flowchart illustrating a method for generating a security token carrier in accordance with embodiment one of the present invention.

Referring to FIG. 1, an embodiment of the present invention provides a method for generating a security token carrier which may include the following procedures.

In block 101, multiple pieces of token information are generated, and a relation which associates the token information with pre-set location information of an interactive security token carrier is established.

The pre-set location information of an interactive security token carrier may be arranged in advance by the user with the security server.

In block 102, security data which is set by a user for protecting the interactive security token carrier is obtained.

In block 103, the interactive security token carrier is generated by using the token information, the relation, the security data and public information of the interactive security token carrier.

In an embodiment, the method may also include: before generating the multiple pieces of token information, a request submitted by the user for obtaining the token information may be obtained.

In an embodiment, the method may also include: after generating the interactive security token carrier, the interactive security token carrier is sent to the user to enable the user to register at a local machine by using the interactive security token carrier.

In an embodiment, the method may also include:

after registration of the user at the local machine by using the interactive security token carrier, an authentication request may be obtained, and information of the interactive security token carrier of the user is found out by using user information in the authentication request;

the user is instructed to manipulate the interactive security token carrier following operation procedures specified by the local machine, information of multiple randomly-selected locations within a currently-displayed face of the interactive security token carrier is generated and presented to the user, and the user is instructed to input token information corresponding to the information of the multiple locations;

token information inputted by the user that is corresponding to the information of the multiple locations is obtained;

the token information inputted by the user is compared with token information obtained by a local machine that is corresponding to the information of the multiple locations;

if the token information inputted by the user is identical to the token information obtained by a local machine, it is determined the user is an authorized user.

In an embodiment, the method may also include: the interactive security token carrier is configured to be installation-free.

The method for generating a security token carrier according to the embodiment of the present invention generates an interactive security token carrier by using token information, a relation which associates the token information with pre-set location information of an interactive security token carrier, security data and public information of the interactive security token carrier, thereby protects the interactive security token carrier by using the security data. In this way, malicious users cannot obtain the interactive security token carrier, and the token information in the interactive security token carrier is displayed during interaction with the user and only part of the token information may be displayed, thus the security of the security token carrier is improved. The interactive security token carrier is generated only when the user requests to obtain token information, which does not require mass production thus saves production costs. The interactive security token carrier may be configured to be installation-free to facilitate storage and carry-around by users. The interactive security token carrier may provide lookup and application of token information during interaction with users, and improves usability of security tokens. Security and flexibility of security tokens can be remarkably improved by displaying as little authentication information as possible during the authentication process.

Embodiment Two

Figure 2:
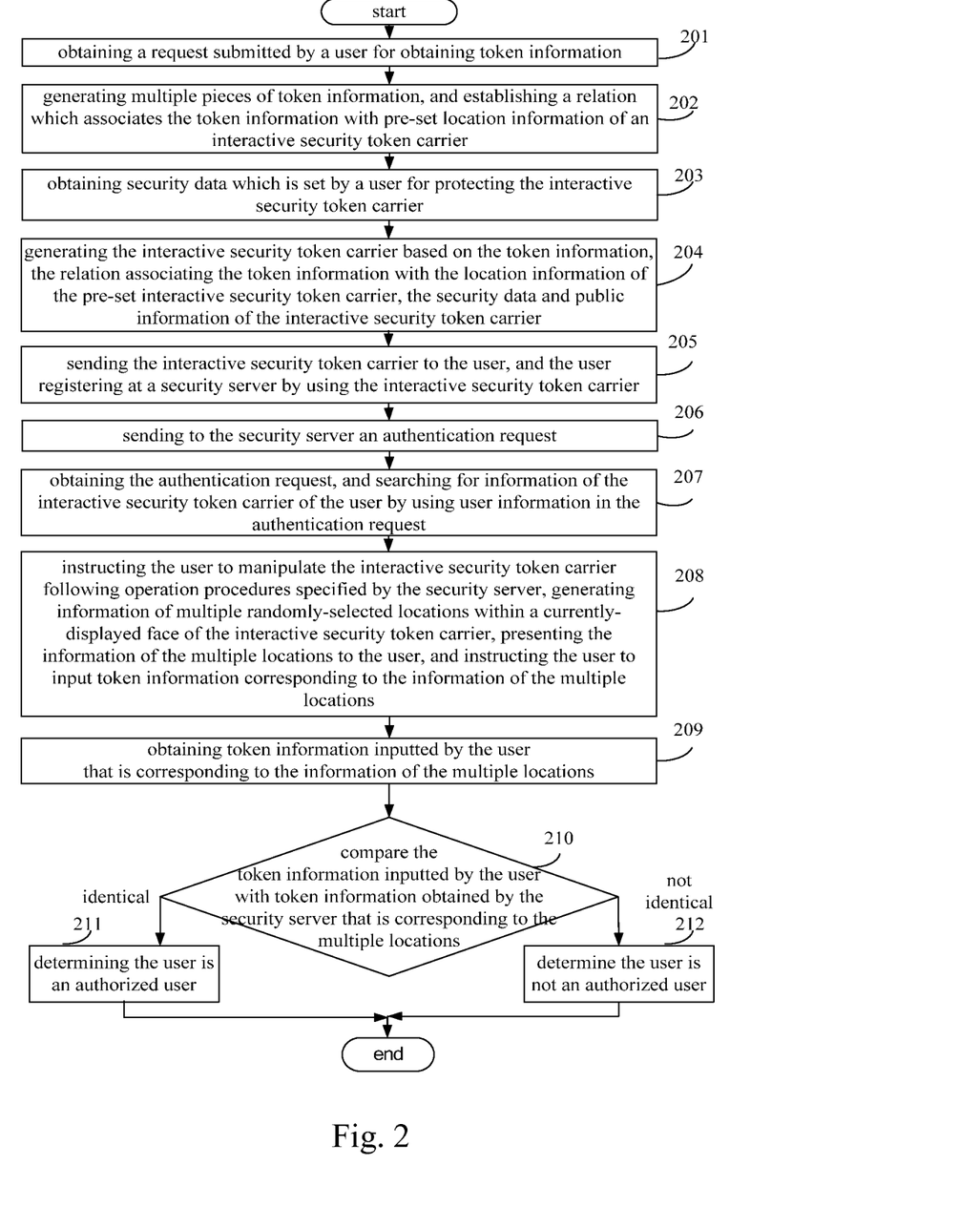
FIG. 2 is a flowchart illustrating a method for generating a security token carrier in accordance with embodiment two of the present invention.

Referring to FIG. 2, an embodiment of the present invention provides a method for generating a security token carrier which may include the following procedures.

In block 201, a security server may obtain a request submitted by a user for obtaining token information.

In block 202, the security server may generate multiple pieces of token information, and establish a relation which associates the token information with pre-set location information of an interactive security token carrier.

The pre-set location information of an interactive security token carrier may be arranged in advance by the user with the security server.

In an embodiment, the security server may use various feasible methods such as randomized algorithms or pre-set functions and the like to generate the multiple pieces of token information, and this is not limited by the present invention. The security server may store the token information and the relation that associates the token information with the pre-set location information of the security token carrier into the security server or another specified location.

The token information may be in the form of figures, characters, symbols or combinations of figures, characters, symbols and the like. For example, multiple pieces of token information generated by using a randomized algorithm may be 101a, b123, 18*7, 9% 24,and so on. To prevent forceful cracking, the number of pieces of token information may be increased to increase the number of possible verifications, e.g., when the number of pieces of token information is 10 and 3 pieces of token information are verified each time, the number of possible verifications is $C_{10}^{3}$; when the number of pieces of token information is 80 and 3 pieces of token information are verified each time, the number of possible verifications is $C_{80}^{3}$.

The interactive security token carrier refers to an executable entity which includes the token information and is capable of enabling interactions. The interactive security token carrier may provide lookup and application of token information during interaction with a user. Taking advantage of the characteristic of the interactive security token carrier that it can enable interactions, interactive security token service providers may design the stochastic space of the token information and the manner in which verification information is presented. Various possible interaction modes may be configured for the interactive security token carrier, e.g., a three-dimensional carrier, a Rubik's Cube-like security token carrier, a room escape game, and so on.

A relation is established to associate the token information with information of a pre-set location of an interactive security token carrier. For example, given the pre-set interactive security token carrier is in the form of a Rubik's Cube, and 6*2*2 pieces of token information are generated by using a randomized algorithm, say 1, 2, 3, 4 . . . , 21, 22, 23, 24; the process of establishing a relation that associates the token information with information of the pre-set location of the interactive security token carrier may include: designating 1 to locate in row 1 column 1 on the 1st face, 2 to locate in row 1 column 2 on the 1st face, 3 to locate in row 2 column 1 on the 1st face, 4 to locate in row 2 column 2 on the 1st face, . . ., 21 to locate in row 1 column 1 on the 6th face, 22 to locate in row 1 column 2 on the 6th face, 23 to locate in row 2 column 1 on the 6th face, 24 to locate in row 2 column 2 on the 6th face.

In order to facilitate users, the interactive security token carrier may be configured to be installation-free, such as configured to be a Flash file, or an installation-free executable client and so on.

In block 203, the security server may obtain security data which is set by a user for protecting the interactive security token carrier.

Certain security data may be set to protect the interactive security token carrier to enhance the security of the interactive security token carrier and to make illegal users unable to obtain the interactive security token carrier or unable to use the interactive security token carrier after the interactive security token carrier is obtained. The security server may store the security data obtained into the security server or another specified location.

In an embodiment, the security data for protecting the interactive security token carrier may include the following procedures.

1) Initiation operation procedures to be performed on the interactive security token carrier.

After obtaining an interactive security token carrier, a user may perform initiation operations on the interactive security token carrier. The security server may also perform initiation operations on the interactive security token carrier based on the initiation operation procedures set by the user. The initial position of the interactive security token carrier obtained by the user is consistent with the initial position used by the security server only when the user and the security server perform the same initiation operation procedures on the interactive security token carrier, such that correct token information can be obtained by the user in subsequent procedures.

For example, when the interactive security token carrier is in the form of a Rubik's Cube, the security data set by the user for protecting the token information may include: an initial turning action of the Rubik's Cube, e.g., turning the Rubik's Cube clockwise. Only when the user firstly turning the Rubik's Cube clockwise can the user obtain the correct token information in subsequent procedures.

2) A password for protecting the interactive security token carrier.

The user may set a password for protecting the interactive security token carrier, and the interactive security token carrier can only be displayed and put to use when a correct password is inputted by the user.

For example, the password for protecting the interactive security token carrier may be set to be 1234; when a user attempts to have the interactive security token carrier displayed, the user is prompted to input a password; and the interactive security token carrier is displayed and put to use when the password inputted by the user is correct.

3) Integrity check data of the interactive security token carrier.

The security server may generate integrity check data of the interactive security token carrier based on the token information, the relation associating the token information with the pre-set location information of the interactive security token carrier. The integrity check data of the interactive security token carrier may be a group of arrays of values. When a user attempts to have the interactive security token carrier displayed, the integrity of the interactive security token carrier is automatically checked by using the group of arrays. If the interactive security token carrier fails the integrity check, the interactive security token carrier is not allowed to be displayed.

In practice, a user may set the security data as any one or any combination of the above listed items according to the needs for security, i.e., the security data may be any one or any combination of: (1) initiation operation procedures to be performed on the interactive security token carrier; (2) a password for protecting the interactive security token carrier; and (3) integrity check data of the interactive security token carrier. The user may also customize the form of the security data according to his/her needs for security, and this is not limited by the present invention.

In block 204, the security server may generate the interactive security token carrier based on the token information, the relation associating the token information with the pre-set location information of the interactive security token carrier, the security data and public information of the interactive security token carrier.

The public information of the interactive security token carrier refers to information shared by interactive security token carriers of the same category, such as the type of the control, the image and the text materials adopted by the interactive security token carriers. For example, when the interactive security token carrier is in the form of a Rubik's Cube, the public information of the interactive security token carrier may include the image for the Rubik's Cube, the size of the Rubik's Cube, the color of the Rubik's Cube, and so on.

The generation of the interactive security token carrier involves using both the known public information (i.e., static data) and real-time information including the token information generated by the security server, the security data submitted by the user and the like (i.e., dynamic data). A method for generating the interactive security token carrier which combines both static data and dynamic data may include the following procedures.

First, the security server may generate a public template by using the public information and a dynamic tag (for storing the real-time data such as the token information generated by the security server, the security data submitted by the user and the like) according to specification of a pre-set file format. The pre-set file format may be the swf format, exe format, or any file format that supports the generating method. Then, the security server may load the token information and the security data into the dynamic tag in the public template. Finally, the security server may convert the public template into an interactive security token carrier in a pre-set file format by using a conversion tool corresponding to the pre-set file format, e.g., a swf file converting tool, an exe file generating tool, and so on.

In block 205, the security server sends the interactive security token carrier to the user, and the user performs registration at the security server by using the interactive security token carrier.

The user performs registration at the security server by using the interactive security token carrier, which is a process of establishing a relation which associates the user with the interactive security token carrier, i.e., the user registers at the security server after obtaining the interactive security token carrier, and the security server establishes a relation which associates the ID of the user with the interactive security token carrier for indicating the interactive security token carrier is a file for authenticating the user.

In block 206, when an application requires authentication of the user, the application may send to the security server an authentication request which includes information of the user.

The application may include: an online game, an e-commerce platform and etc. that the user attempts to log in.

In block 207, the security server may obtain the authentication request, and obtain information of the interactive security token carrier of the user by using user information in the authentication request.

In block 208, the security server may instruct the user to manipulate the interactive security token carrier following operation procedures specified by the security server, generate information of multiple randomly-selected locations on a currently-displayed face of the interactive security token carrier, present the information of the multiple locations to the user, and instruct the user to input token information corresponding to the information of the multiple locations.

For example, when the interactive security token carrier is in the form of a Rubik's Cube, the security server may instruct the user to firstly turn the Rubik's Cube counter-clockwise for 3 times, then turn the Rubik's Cube clockwise twice, randomly selecting multiple locations on the face that is currently displayed (e.g., the second face) of the Rubik's Cube which has been turned counter-clockwise for 3 times and clockwise twice, and instruct the user to input token information corresponding to the multiple locations through an authentication box.

It should be noted that under circumstances that the user has set security data for protecting the interactive security token carrier, when the security server instructs the user to input the token information corresponding to the multiple locations, if the security data set by the user includes procedures of performing initiation operations on the interactive security token carrier, the currently-displayed face of the interactive security token carrier on the user terminal is identical with the current face of the interactive security token carrier in the server so as to enable the user to obtain correct token information only when the user has performed correct initiation operation procedures on the interactive security token carrier and performed operation procedures specified by the security server on the interactive security token carrier; if the security data set by the user includes a password for protecting the interactive security token carrier, the user can not perform the operation procedures specified by the security server on the interactive security token carrier so as to obtain correct token information unless correct password is inputted by the user to have the interactive security token carrier displayed; if the security data set by the user includes integrity check data of the interactive security token carrier, the user can not have the interactive security token carrier displayed and perform the operation procedures specified by the security server on the interactive security token carrier so as to obtain correct token information unless the interactive security token carrier has passed the integrity check based on the integrity check data when the user attempts to have the interactive security token carrier displayed.

In addition, it can be seen that after the user performed the operation procedures specified by the security server on the interactive security token carrier, only one of the faces of the interactive security token carrier may be displayed (e.g., a Rubik's Cube has 6 faces, and only 2 faces may be displayed), i.e., only a small part of the token information is displayed, thus the security and flexibility of the security token carrier can be improved remarkably.

In block 209, the security server may obtain token information corresponding to the information of the multiple locations inputted by the user.

In block 210, the security server may compare the token information inputted by the user with token information obtained by the security server that is corresponding to the multiple locations, and the procedure in block 211 is performed when the token information is identical or the procedure in block 212 is performed when the token information is not identical.

In block 211, the security server may determine the user is an authorized user, and allow subsequent operations of the user, and terminate the process.

In block 212, the security server may determine the user is not an authorized user, require the user to perform another authentication, and terminate the process.

The method for generating a security token carrier according to the embodiment of the present invention generates an interactive security token carrier by using token information, a relation which associates the token information with pre-set location information of an interactive security token carrier, security data and public information of the interactive security token carrier, thereby protects the interactive security token carrier by using the security data. In this way, the interactive security token carrier is hard to be obtained by malicious users, and the token information in the interactive security token carrier is displayed only during interaction with the user. Only part of the token information may be displayed, thus the security of the security token carrier is improved. The interactive security token carrier is generated only when the user requests to obtain token information, which does not require mass production and saves production costs. The interactive security token carrier may be configured to be installation-free to facilitate storage and carry-around by users. The interactive security token carrier may provide lookup of token information during interaction with users, and improves usability of security tokens. Security and flexibility of security tokens can be remarkably improved by displaying as little authentication information as possible during an authentication process.

Embodiment Three

Figure 3:
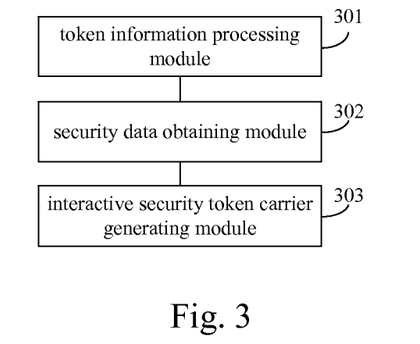
FIG. 3 is a schematic diagram illustrating a first structure of an apparatus for generating a security token carrier in accordance with embodiment three of the present invention.

Referring to FIG. 3, an embodiment of the present invention provides an apparatus for generating a security token carrier which may include the following components.

A token information processing module 301 is configured for generating multiple pieces of token information, establishing a relation which associates the token information with pre-set location information of an interactive security token carrier.

The pre-set location information of the interactive security token carrier may be arranged in advance by the user with the security server.

A security data obtaining module 302 is configured for obtaining security data which is set by a user for protecting the interactive security token carrier.

An interactive security token carrier generating module 303 is configured for generating the interactive security token carrier by using the token information, the relation, the security data and public information of the interactive security token carrier.

Figure 4:
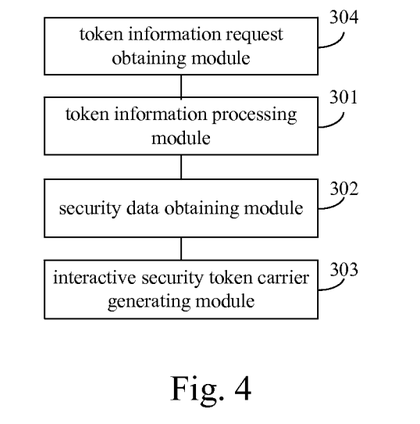
FIG. 4 is a schematic diagram illustrating another structure of an apparatus for generating a security token carrier in accordance with embodiment three of the present invention.

In an embodiment as shown in FIG. 4, the apparatus may also include: a token information requesting module 304, configured for obtaining a request submitted by the user for obtaining token information before the token information processing module 301 generates the token information.

Figure 5:
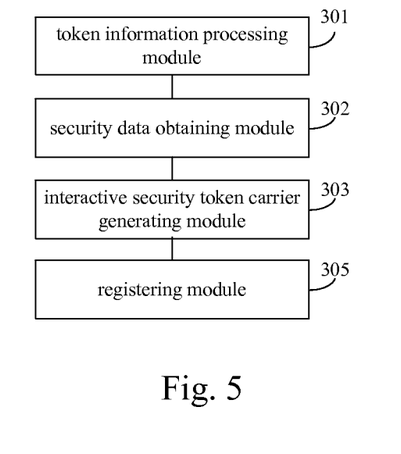
FIG. 5 is a schematic diagram illustrating yet another structure of an apparatus for generating a security token carrier in accordance with embodiment three of the present invention.

In an embodiment as shown in FIG. 5, the apparatus may also include: a registering module 305, configured for sending the interactive security token carrier to the user to enable the user to perform registration at the apparatus by using the interactive security token carrier after the interactive security token carrier generating module 303 generates the interactive security token carrier.

Figure 6:
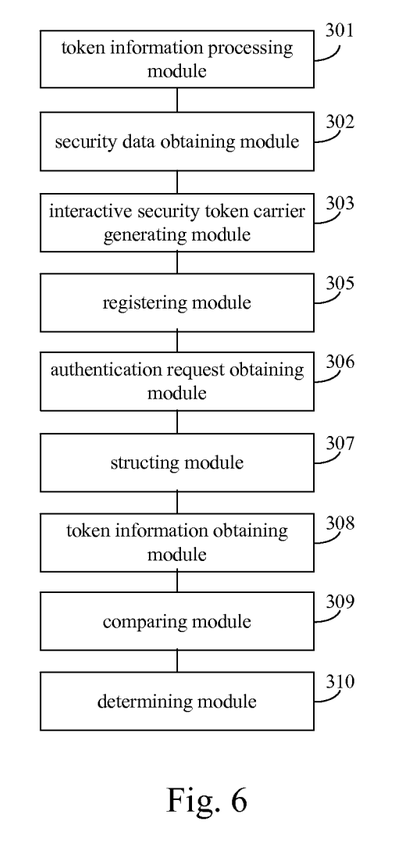
FIG. 6 is a schematic diagram illustrating still another structure of an apparatus for generating a security token carrier in accordance with embodiment three of the present invention.

In an embodiment as shown in FIG. 6, the apparatus may also include:

an authentication request obtaining module 306, for obtaining an authentication request after the registering module 305 enables the user to perform registration at the apparatus by based on the interactive security token carrier, and searching for information of the interactive security token carrier of the user by using information of the user in the authentication request;

an instructing module 307, for instructing the user to manipulate the interactive security token carrier according to operation procedures specified by the apparatus after the authentication request obtaining module 306 obtained information of the interactive security token carrier of the user, generating information of multiple randomly-selected locations within a currently-displayed face of the interactive security token carrier, presenting the information of the multiple locations to the user, and instructing the user to input token information corresponding to the information of the multiple locations;

a token information obtaining module 308, for obtain token information inputted by the user that is corresponding to the information of the multiple locations after the instructing module 307 instructs the user to input token information corresponding to the information of the multiple locations;

a comparing module 309, for comparing the token information inputted by the user with token information obtained by the apparatus that is corresponding to the information of the multiple locations after the token information obtaining module 308 has obtained the token information inputted by the user that is corresponding to the information of the multiple locations; and a determining module 310, for determining the user to be an authorized user when a comparison result obtained by the comparing module 309 indicates the token information inputted by the user is identical to the token information obtained by the apparatus.

Figure 7:
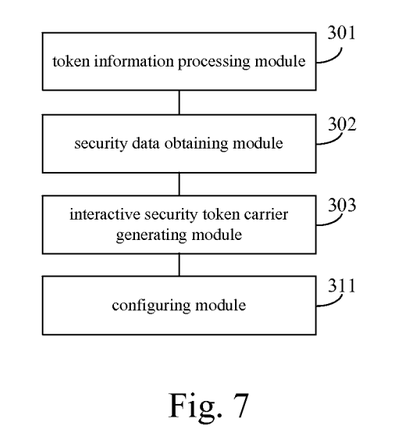
FIG. 7 is a schematic diagram illustrating yet another structure of an apparatus for generating a security token carrier in accordance with embodiment three of the present invention.

In an embodiment as shown in FIG. 7, the apparatus may also include: a configuring module 311 for configuring the interactive security token carrier to be installation-free.

The apparatus for generating a security token carrier according to the embodiment of the present invention generates an interactive security token carrier by using token information, a relation which associates the token information with pre-set location information of an interactive security token carrier, security data and public information of the interactive security token carrier, thereby protects the interactive security token carrier by using the security data. In this way, the interactive security token carrier is hard to be obtained by malicious users, and the token information in the interactive security token carrier is displayed only during interaction with the user. Only part of the token information may be displayed, thus the security of the security token carrier is improved. The interactive security token carrier is generated only when the user requests to obtain token information, which does not require mass production and saves production costs. The interactive security token carrier may be configured to be installation-free to facilitate storage and carry-around by users. The interactive security token carrier may provide lookup of token information during interaction with users, and improves usability of security tokens. Security and flexibility of security tokens can be remarkably improved by displaying as little authentication information as possible during an authentication process.

All or part of contents of the technical schemes provided by the above embodiments may be implemented by software program. The software program may be stored in an accessible non-transitory storage medium. The storage medium may include a hard drive of a computer, a compact disk, or a floppy disk.

The foregoing is only embodiments of the present invention. The protection scope of the present invention, however, is not limited to the above description. All the modifications, equivalent replacements or improvements, which can be easily obtained by those skilled in the art, are included within the protection scope of the present invention.

The invention claimed is:

1. A method for generating a security token carrier, comprising:

generating, by a server, multiple pieces of token information which include plural values, establishing a relation which associates the token information with pre-set location information of an interactive security token carrier;

obtaining, by the server, security data which is set by a user for protecting the interactive security token carrier; and generating, by the server, the interactive security token carrier by using the token information, the relation, the security data and public information of the interactive security token carrier, the interactive security token carrier includes plural faces, and each of the plural faces includes plural locations each of which is associated with one of the plural values according to the relation;

sending, by the server, the interactive security token carrier to the user;

sending, by the server, an instruction to the user requesting login, the instruction specifying at least one procedures of manipulating the interactive security token carrier to have one of the plural faces displayed and plural randomly-selected locations for determining plural values on the face displayed after the interactive security token carrier is manipulated through the at least one procedures;

receiving, by the server, multiple values inputted by the user;

comparing, by the server, the received values with locally generated values obtained using the interactive security token carrier, the at least one procedures and the plural randomly-selected locations; and determining, by the server, the user is an authorized user if the received values are consistent with the locally generated values.

2. The method of claim 1, further comprising:
obtaining a request submitted by the user for obtaining token information before generating the multiple pieces of token information.

3. The method of claim 1, further comprising:
sending the interactive security token carrier to the user to enable the user to register at a local machine by using the interactive security token carrier after generating the interactive security token carrier.

4. The method of claim 3, further comprising:
after the user has registered at the local machine by using the interactive security token carrier, obtaining an authentication request, and searching for information of the interactive security token carrier of the user by using information of the user in the authentication request;

instructing the user to manipulate the interactive security token carrier following operation procedures specified by the local machine, generating information of multiple randomly-selected locations within a currently-displayed face of the interactive security token carrier, presenting the information of the multiple locations to the user, and instructing the user to input token information corresponding to the information of the multiple locations;

obtaining token information inputted by the user that is corresponding to the information of the multiple locations;

comparing the token information inputted by the user with token information obtained by a local machine that is corresponding to the information of the multiple locations;

determining the user is an authorized user when the token information inputted by the user is identical to the token information obtained by the local machine.

5. The method of claim 1, further comprising:
configuring the interactive security token carrier to be installation-free.

6. The method of claim 1, wherein the security data comprises any one or any combination of: initiation operation procedures to be performed on the interactive security token carrier; a password for protecting the interactive security token carrier; and integrity check data of the interactive security token carrier.

7. The method of claim 1, wherein the interactive security token carrier is arranged in advance by the user with a server.

8. The method of claim 1, the interactive security token carrier is a three-dimensional carrier.

9. The method of claim 8, wherein the three-dimensional carrier is in form of a Rubik's Cube.

10. The method of claim 9, wherein the security data comprises initiation operation procedures of turning the Rubik's Cube.

11. The method of claim 1, wherein the security data comprises initiation operation procedures to be performed on the interactive security token carrier; the locally generated values are obtained by manipulating the interactive security token carrier through the initiation operation procedures and the at least one procedures.

12. An apparatus for generating a security token carrier, comprising: a processor and a memory storing computer-readable instructions executable by the processor to:

generate multiple pieces of token information which include plural values, establish a relation which associates the token information with pre-set location information of an interactive security token carrier;

obtain security data which is set by a user for protecting the interactive security token carrier; and generate the interactive security token carrier by using the token information, the relation, the security data and public information of the interactive security token carrier, the interactive security token carrier includes plural faces, and each of the plural faces includes plural locations each of which is associated with one of the plural values according to the relation;

send the interactive security token carrier to the user;

send an instruction to the user requesting login, the instruction specifying at least one procedures of manipulating the interactive security token carrier to have one of the plural faces displayed and plural randomly-selected locations for determining plural values on the face displayed after the interactive security token carrier is manipulated through the at least one procedures;

receive multiple values inputted by the user;

compare the received values with locally generated values obtained using the interactive security token carrier, the at least one procedures and the plural randomly-selected locations; and determine the user is an authorized user if the received values are consistent with the locally generated values.

13. The apparatus of claim 12, wherein the instructions are executable by the processor to:

obtain a request submitted by the user for obtaining the token information before generating the token information.

14. The apparatus of claim 12, wherein the instructions are executable by the processor to:

send the interactive security token carrier to the user to enable the user to register at the apparatus by using the interactive security token carrier after generating the interactive security token carrier.

15. The apparatus of claim 14, wherein the instructions are executable by the processor to:

obtain an authentication request after making the user perform registration at the apparatus by based on the interactive security token carrier, and search for information of the interactive security token carrier of the user by using information of the user in the authentication request;

instruct the user to manipulate the interactive security token carrier according to operation procedures specified by the apparatus after obtaining information of the interactive security token carrier of the user, generate information of multiple randomly-selected locations within a currently-displayed face of the interactive security token carrier, present the information of the multiple locations to the user, and instruct the user to input token information corresponding to the information of the multiple locations;

obtain token information inputted by the user that is corresponding to the information of the multiple locations after instructing the user to input token information corresponding to the information of the multiple locations;

compare the token information inputted by the user with token information obtained by the apparatus that is corresponding to the information of the multiple locations after obtain the token information inputted by the user that is corresponding to the information of the multiple locations; and determining the user to be an authorized user when a comparison result indicates the token information inputted by the user is identical to the token information obtained by the apparatus.

16. The apparatus of claim 12, wherein the instructions are executable by the processor to:

configure the interactive security token carrier to be installation-free.

17. The apparatus of claim 12, wherein the security data comprises initiation operation procedures to be performed on the interactive security token carrier; the locally generated values are obtained by manipulating the interactive security token carrier through the initiation operation procedures and the at least one procedures.

* * * * *